US012802329B2

(12) United States Patent
Liang et al.

(10) Patent No.: US 12,802,329 B2
(45) **Date of Patent: *Nov. 17, 2026**

(54) SLICED GRAPHICS PROCESSING UNIT (GPU) ARCHITECTURE IN PROCESSOR-BASED DEVICES

(71) Applicant: QUALCOMM Incorporated, San Diego, CA (US)

(72) Inventors: Jian Liang, San Diego, CA (US); Andrew Evan Gruber, Arlington, MA (US); Tao Wang, Sunnyvale, CA (US); Xuefeng Tang, San Diego, CA (US); Vishwanath Shashikant Nikam, Bangalore (IN); Nigel Poole, West Newton, MA (US); Kalyan Kumar Bhiravabhatla, Bengaluru (IN); Fei Xu, San Jose, CA (US); Zilin Ying, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 18/067,837

(22) Filed: Dec. 19, 2022

(65) Prior Publication Data

US 2024/0078735 A1 Mar. 7, 2024

Related U.S. Application Data

(60) Provisional application No. 63/374,286, filed on Sep. 1, 2022.

(51) Int. Cl.
*G06T 15/00* (2011.01)

(52) U.S. Cl.
CPC .................................. *G06T 15/005* (2013.01)

(58) Field of Classification Search
None
See application file for complete search history.

(56) References Cited

U.S. PATENT DOCUMENTS 4,755,930 A * 7/1988 Wilson, Jr. .......... G06F 12/0811
711/E12.024
6,961,057 B1 11/2005 Van Dyke et al.
(Continued)

FOREIGN PATENT DOCUMENTS

WO 2024050188 A1 3/2024

OTHER PUBLICATIONS

International Search Report and Written Opinion for International Patent Application No. PCT/US2023/070810, mailed Nov. 9, 2023, 14 pages.

*Primary Examiner* — Kent W Chang
*Assistant Examiner* — Jonathan M Cofino
(74) *Attorney, Agent, or Firm* — W&T

(57) ABSTRACT

In some aspects disclosed herein, a GPU based on a sliced GPU architecture includes multiple hardware slices. The GPU further includes a command processor (CP) circuit and an unslice primitive controller (PC_US). Upon receiving a graphics instruction from a central processing unit (CPU), the CP circuit determines a graphics workload, and transmits the graphics workload to the PC_US. The PC_US then partitions the graphics workload into multiple subbatches and distributes each subbatch to a PC_S of a hardware slice for processing.

26 Claims, 9 Drawing Sheets

(56) References Cited

U.S. PATENT DOCUMENTS

| | | | | |
|---|---|---|---|---|
| 2006/0095684 | A1* | 5/2006 | Shen | G06F 12/0831 711/146 |
| 2008/0273033 | A1 | 11/2008 | Brennan | |
| 2011/0090220 | A1* | 4/2011 | Molnar | G06T 15/005 345/420 |
| 2012/0280998 | A1 | 11/2012 | Nordlund | |
| 2013/0155080 | A1 | 6/2013 | Nordlund et al. | |
| 2015/0109293 | A1* | 4/2015 | Wang | G06T 15/405 345/422 |
| 2016/0086299 | A1 | 3/2016 | Sharma et al. | |
| 2017/0256020 | A1* | 9/2017 | Sansottera | G06T 1/20 |
| 2018/0115496 | A1 | 4/2018 | Eckert et al. | |
| 2019/0295313 | A1 | 9/2019 | Davies et al. | |
| 2019/0362533 | A1 | 11/2019 | Fuller | |
| 2020/0211252 | A1* | 7/2020 | Surti | G06T 1/20 |
| 2021/0191868 | A1 | 6/2021 | Ray et al. | |
| 2022/0261347 | A1 | 8/2022 | Koker et al. | |
| 2022/0327654 | A1 | 10/2022 | Nikam et al. | |
| 2023/0092394 | A1 | 3/2023 | Neelambaran et al. | |
| 2024/0078737 | A1 | 3/2024 | Liang et al. | |
| 2024/0221279 | A1 | 7/2024 | Tang et al. | |

* cited by examiner

SLICED GRAPHICS PROCESSING UNIT (GPU) ARCHITECTURE IN PROCESSOR-BASED DEVICES

PRIORITY CLAIM

The present application claims priority to U.S. Provisional Patent Application Ser. No. 63/374,286, filed on Sep. 1, 2022 and entitled "SLICED GRAPHICS PROCESSING UNIT (GPU) ARCHITECTURE IN PROCESSOR-BASED DEVICES," the contents of which is incorporated herein by reference in its entirety.

BACKGROUND

I. Field of the Disclosure

The technology of the disclosure relates generally to graphics processing unit (GPU) architectures in processor-based devices.

II. Background

Modern processor-based devices include a dedicated processing unit known as a graphics processing unit (GPU) to accelerate the rendering of graphics and video data for display. A GPU may be implemented as an integrated element of a general-purpose central processing unit (CPU), or as a discrete hardware element that is separate from the CPU. Due to their highly parallel architecture and structure, a GPU is capable of executing algorithms that process large blocks of data in parallel more efficiently than general-purpose CPUs. For example, GPUs may use a mode known as "tile rendering" or "bin-based rendering" to render a three-dimensional (3D) graphics image. The GPU subdivides an image, which can be decomposed into triangles, into a number of smaller tiles. The GPU then determines which triangles making up the image are visible in each tile and renders each tile in succession, using fast on-chip memory in the GPU to hold the portion of the image inside the tile. Once the tile has been rendered, the on-chip memory is copied out to its proper location in system memory for outputting to a display, and the next tile is rendered.

The process of rendering a tile by the GPU can be further subdivided into multiple operations that may be performed concurrently in separate processor cores or graphics hardware pipelines. For example, tile rendering may involve a tile visibility thread executing on a first processor core, a rendering thread executing on a second processor core, and a resolve thread executing on a third processor core. The purpose of the tile visibility thread is to determine which triangles contribute fragments to each of the tiles, with the result being a visibility stream that contains a bit for each triangle that was checked, and that indicates whether the triangle was visible in a given tile. The visibility stream is compressed and written into the system memory. The GPU also executes a rendering thread to draw the portion of the image located inside each tile, and to perform pixel rasterization and shading. Triangles that are not culled by the visibility stream check are rendered by this thread. Finally, the GPU may also execute a resolve thread to copy the portion of the image contained in each tile out to the system memory. After the rendering of a tile is complete, color content of the rendered tile is resolved into the system memory before proceeding to the next tile.

In response to market pressures to produce GPUs that are capable of higher levels of performance, GPU manufacturers have begun to scale up the physical size of the GPU. However, the implementation of a conventional GPU architecture in a larger physical size does not necessarily result in improved performance and can even raise issues not encountered with smaller GPU. For example, with smaller GPUs, increasing voltage results in a correspondingly increased maximum frequency, reflecting a generally linear relationship between voltage and frequency. Because wire delay also plays a large role in determining maximum frequency, though, increasing voltage in larger GPUs beyond a particular point will not increase maximum frequency in a linear fashion. Moreover, because GPUs are configured to operation as Single Instruction Multiple Data (SIMD) processors, they are most efficient when operating on large quantities of data. Because larger GPUs require workloads to be distributed as smaller data chunks, they may not be able to fill each processing pipeline sufficiently to mask latency issues incurred by memory fetches. Additionally, differences in workload and execution speed within different pipelines within the GPU, as well as different execution bottlenecks (i.e., Double Data Rate (DDR) memory bottlenecks versus internal GPU bottlenecks), may also cause larger GPU sizes to fail to translate into GPU performance gains.

SUMMARY OF THE DISCLOSURE

Aspects disclosed in the detailed description include a sliced graphics processing unit (GPU) architecture in processor-based devices. Related apparatus and methods are also disclosed. In this regard, in some exemplary aspects disclosed herein, a GPU based on a sliced GPU architecture includes multiple hardware slices that each comprise a slice primitive controller (PC_S) and multiple slice hardware units. The slice hardware units of each hardware slice include a geometry pipeline controller (GPC), a vertex shader (VS), a graphics rasterizer (GRAS), a low-resolution Z buffer (LRZ), a render backend (RB), a cache and compression unit (CCU), a graphics memory (GMEM), a high-level sequencer (HLSQ), a fragment shader/texture pipe (FS/TP), and a cluster cache (CCHE). In addition, the GPU further includes a command processor (CP) circuit and an unslice primitive controller (PC_US). Upon receiving a graphics instruction from a central processing unit (CPU), the CP circuit determines a graphics workload based on the graphics instruction and transmits the graphics workload to the PC_US. The PC_US then partitions the graphics workload into multiple subbatches and distributes each subbatch to a PC_S of a hardware slice for processing (e.g., based on a round-robin slice selection mechanism, and/or based on a current processing utilization of each hardware slice). By applying the sliced GPU architecture, a large GPU may be implemented as multiple hardware slices, with graphics workloads more efficiently subdivided among the multiple hardware slices. In this manner, the issues noted above with respect to physical design, clock frequency, design scalability, and workload imbalance may be effectively addressed.

Some aspects may further provide that each CCHE of each hardware slice may receive data from one or more clients (i.e., one or more of the plurality of slice hardware units) and may synchronize the one or more clients. A unified cache (UCHE) coupled to the CCHEs in such aspects also synchronizes the plurality of hardware slices. In some aspect, each LRZ of each hardware slice is configured to store cache lines corresponding only to pixel tiles that are assigned to the corresponding hardware slice. This may be accomplished by first mapping screen coordinates into a slice space that is continuous in coordinates and holds blocks for the hardware slice only, and then addressing tiles based on coordinates in the slice space.

According to some aspects, the hardware slices of the GPU perform additional operations to determine triangle visibility and assign triangle vertices to corresponding hardware slices. The GPU in such aspects further comprises an unslice vertex parameter cache (VPC_US), while each of the hardware slices further includes a corresponding slice Triangle Setup Engine front end (TSEFE_S), a slice vertex parameter cache front end (VPCFE_S), a slice vertex parameter cache back end (VPCBE_S), and a Triangle Setup Engine (TSE). Each VPCFE_S of each hardware slice may receive, from a corresponding VS of the hardware slice, primitive attribute and position outputs generated by the VS, and may write the primitive attribute and position outputs to the GMEM of the hardware slice. Each TSEFE_S of each corresponding hardware slice next determines triangle visibility for one or more hardware slices, based on the primitive attributes and position outputs. Each TSEFE_S then transmits one or more indications of triangle visibility for each of the one or more hardware slices to a VPC_US, which assigns triangles visible to each of the one or more hardware slices to the corresponding hardware slice based on the one or more indications of triangle visibility. Each VPCBE_S of each hardware slice identifies vertices for the triangles visible to the corresponding hardware slice, based on the triangles assigned by the VPC_US, and then transmits the vertices to a TSE of the corresponding hardware slice.

In another aspect, a processor-based device is provided. The processor-based device comprises a GPU that comprises a plurality of hardware slices, a CP circuit, and a PC_US. Each hardware slice of the plurality of hardware slices comprises a PC_S and a plurality of slice hardware units. The plurality of slice hardware units comprising a GPC, a VS, a GRAS, a LRZ, an RB, a CCU, a GMEM, an HLSQ, an FS/TP, and a CCHE. The CP circuit is configured to receive a graphics instruction from a CPU. The CP circuit is further configured to determine a graphics workload based on the graphics instruction. The CP circuit is also configured to transmit the graphics workload to the PC_US. The PC_US is configured to receive the graphics workload from the CP circuit. The PC_US is further configured to partition the graphics workload into a plurality of subbatches. The PC_US is also configured to distribute each subbatch of the plurality of subbatches to a PC_S of a hardware slice of the plurality of hardware slices for processing.

In another aspect, a processor-based device is provided. The processor-based device comprises means for receiving a graphics instruction from a CPU. The processor-based device further comprises means for determining a graphics workload based on the graphics instruction. The processor-based device also comprises means for partitioning the graphics workload into a plurality of subbatches. The processor-based device additionally comprises means for distributing each subbatch of the plurality of subbatches to a hardware slice of a plurality of hardware slices of a GPU for processing. Each hardware slice of the plurality of hardware slices comprises a plurality of slice hardware units, the plurality of slice hardware units comprising a GPC, a VS, a GRAS, a LRZ, an RB, a CCU, a GMEM, an HLSQ, an FS/TP, and a CCHE.

In another aspect, a method for operating a sliced GPU architecture is provided. The method comprises receiving, by a CP circuit of a GPU, a graphics instruction from a CPU. The method further comprises determining a graphics workload based on the graphics instruction. The method also comprises transmitting the graphics workload to a PC_US of the GPU. The method additionally comprises receiving, by the PC_US, the graphics workload from the CP circuit. The method further comprises partitioning the graphics workload into a plurality of subbatches. The method also comprises distributing each subbatch of the plurality of subbatches to a PC_S of a hardware slice of a plurality of hardware slices of the GPU for processing. Each hardware slice of the plurality of hardware slices further comprises a plurality of slice hardware units, the plurality of slice hardware units comprising a GPC, a VS, a GRAS, a LRZ, an RB, a CCU, a GMEM, an HLSQ, an FS/TP, and a CCHE.

In another aspect, a non-transitory computer-readable medium is disclosed, having stored thereon computer-executable instructions which, when executed by a processor, cause the processor to receive a graphics instruction. The computer-executable instructions further cause the processor to determine a graphics workload. The computer-executable instructions also cause the processor to partition the graphics workload into a plurality of subbatches. The computer-executable instructions additionally cause the processor to distribute each subbatch of the plurality of subbatches to a slice primitive controller (PC_S) of a hardware slice of a plurality of hardware slices for processing, wherein each hardware slice of the plurality of hardware slices comprises a plurality of slice hardware units, the plurality of slice hardware units comprising a GPC, a VS, a GRAS, a LRZ, an RB, a CCU, a GMEM, an HLSQ, an FS/TP, and a CCHE.

DETAILED DESCRIPTION

Figure 1:
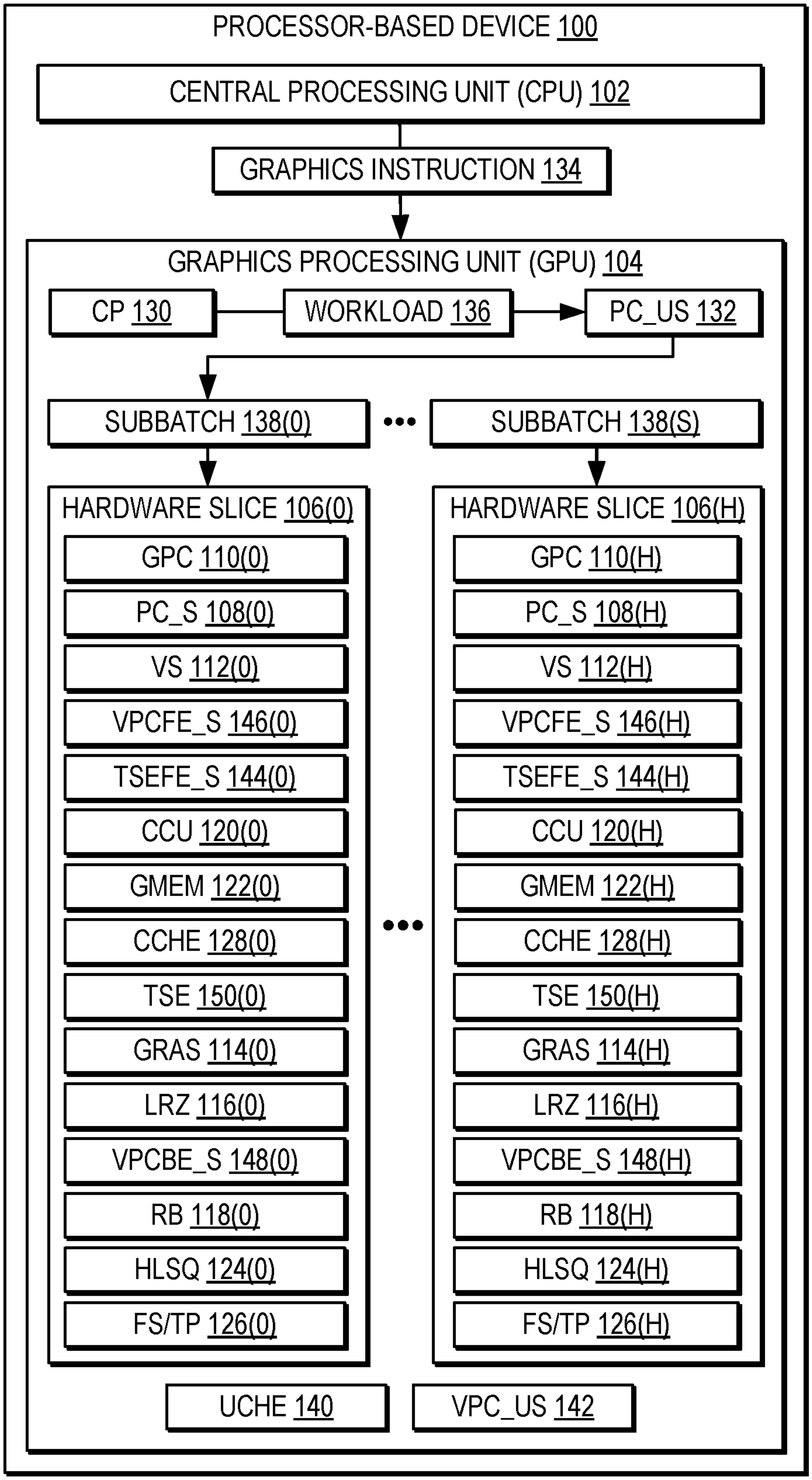
FIG. 1 is a block diagram of an exemplary processor-based device including a graphics processing unit (GPU) based on a sliced GPU architecture.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a sliced graphics processing unit (GPU) architecture in processor-based devices. Related apparatus and methods are also disclosed. In this regard, in some exemplary aspects disclosed herein, a GPU based on a sliced GPU architecture includes multiple hardware slices that each comprise a slice primitive controller (PC_S) and multiple slice hardware units. The slice hardware units of each hardware slice include a geometry pipeline controller (GPC), a vertex shader (VS), a graphics rasterizer (GRAS), a low-resolution Z buffer (LRZ), a render backend (RB), a cache and compression unit (CCU), a graphics memory (GMEM), a high-level sequencer (HLSQ), a fragment shader/texture pipe (FS/TP), and a cluster cache (CCHE). In addition, the GPU further includes a command processor (CP) circuit and an unslice primitive controller (PC_US). Upon receiving a graphics instruction from a central processing unit (CPU), the CP circuit determines a graphics workload based on the graphics instruction and transmits the graphics workload to the PC_US. The PC_US then partitions the graphics workload into multiple subbatches and distributes each subbatch to a PC_S of a hardware slice for processing (e.g., based on a round-robin slice selection mechanism, and/or based on a current processing utilization of each hardware slice). By applying the sliced GPU architecture, a large GPU may be implemented as multiple hardware slices, with graphics workloads more efficiently subdivided among the multiple hardware slices. In this manner, the issues noted above with respect to physical design, clock frequency, design scalability, and workload imbalance may be effectively addressed.

Some aspects may further provide that each CCHE of each hardware slice may receive data from one or more clients (i.e., one or more of the plurality of slice hardware units) and may synchronize the one or more clients. A unified cache (UCHE) coupled to the CCHEs in such aspects also synchronizes the plurality of hardware slices. In some aspect, each LRZ of each hardware slice is configured to store cache lines corresponding only to pixel tiles that are assigned to the corresponding hardware slice. This may be accomplished by first mapping screen coordinates into a slice space that is continuous in coordinates and holds blocks for the hardware slice only, and then addressing tiles based on coordinates in the slice space.

According to some aspects, the hardware slices of the GPU perform additional operations to determine triangle visibility and assign triangle vertices to corresponding hardware slices. The GPU in such aspects further comprises an unslice vertex parameter cache (VPC_US), while each of the hardware slices further includes a corresponding slice Triangle Setup Engine front end (TSEFE_S), a slice vertex parameter cache front end (VPCFE_S), a slice vertex parameter cache back end (VPCBE_S), and a Triangle Setup Engine (TSE). Each VPCFE_S of each hardware slice may receive, from a corresponding VS of the hardware slice, primitive attribute and position outputs generated by the VS, and may write the primitive attribute and position outputs to the GMEM of the hardware slice. Each TSEFE_S of each corresponding hardware slice next determines triangle visibility for one or more hardware slices, based on the primitive attributes and position outputs. Each TSEFE_S then transmits one or more indications of triangle visibility for each of the one or more hardware slices to a VPC_US, which assigns triangles visible to each of the one or more hardware slices to the corresponding hardware slice based on the one or more indications of triangle visibility. Each VPCBE_S of each hardware slice identifies vertices for the triangles visible to the corresponding hardware slice, based on the triangles assigned by the VPC_US, and then transmits the vertices to a TSE of the corresponding hardware slice.

In this regard, FIG. 1 is a block diagram of an exemplary processor-based device 100. The processor-based device comprises a CPU 102, which also may be referred to herein as a "processor core" or a "CPU core," may be an in-order or an out-of-order processor (OoP), and/or may be one of a plurality of CPUs 102 provided by the processor-based device 100. Examples of the CPU 102 may include, but are not limited to, a digital signal processor (DSP), general-purpose microprocessor, application specific integrated circuit (ASIC), field programmable logic array (FPGA), or other equivalent integrated or discrete logic circuitry. As seen in FIG. 1, the CPU 102 comprises a graphics processing unit (captioned as "GPU" in FIG. 1) 104, which comprises one or more dedicated processors for performing graphical operations. As a non-limiting example, the GPU 104 may comprise a dedicated hardware unit having fixed functionality and programmable components for rendering graphics and executing GPU applications. The GPU 104 may also include a DSP, a general-purpose microprocessor, an ASIC, an FPGA, or other equivalent integrated or discrete logic circuitry. Note that, while the CPU 102 and GPU 104 are illustrated as separate units in the example of FIG. 1, in some examples, the CPU 102 and GPU 104 may be integrated into a single unit. Although not shown in FIG. 1, it is to be understood that the CPU 102 of FIG. 1 may execute a software application or an Application Programming Interface (API) that submits, to the CPU, graphics instructions from which a graphics workload (comprising, e.g., multiple primitives) may be determined for processing by the GPU 104.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 may include elements in addition to those illustrated in FIG. 1, and/or may include more or fewer of the elements illustrated in FIG. 1. For example, the processor-based device 100 may further include additional CPUs 102, processor cores, caches, controllers, communications buses, and/or persistent storage devices, which are omitted from FIG. 1 for the sake of clarity.

To address issues that may arise with respect to physical design, clock frequency, design scalability, and workload imbalance when increasing the physical size of the GPU 104, the GPU 104 in the example of FIG. 1 implements a sliced GPU architecture. Accordingly, the GPU 104 is configured to include multiple hardware slices 106(0)-106(H) that each provides a corresponding slice primitive controller (captioned as "PC_S" in FIG. 1) 108(0)-108(H) and multiple slice hardware units. As used herein, the phrase "slice hardware units" refers to elements of each hardware slice that provide functionality corresponding to conventional elements of a graphics pipeline of a GPU, and includes to GPCs 110(0)-110(H), VSs 112(0)-112(H), GRASs 114(0)-114(H), LRZs 116(0)-116(H), RB 118(0)-118(H), CCUs 120(0)-120(H), GMEMs 122(0)-122(H), HLSQs 124(0)-124(H), FS/TPs 126(0)-126(H), and CCHEs 128(0)-128(H). The GPU 104 further includes a CP circuit (captioned as "CP" in FIG. 1) 130 and a PC_US 132.

Each of the GPCs 110(0)-110(H) manages the manner in which vertices form the geometry of images to be rendered and are responsible for fetching vertices from memory and handling vertex data caches and vertices transformation. The VSs 112(0)-112(H) perform vertex transformation calculations, while each of the GRASs 114(0)-114(H) use information received from the GPCs 110(0)-110(H) to select vertices and build the triangles of which graphics images are composed. Each of the GRASs 114(0)-114(H) also converts the triangles into view port coordinates and remove triangles that are outside the view port (i.e., "back facing" triangles), and rasterizes each triangle to select pixels inside the triangle for later processing. The LRZs 116(0)-116(H) provide a mechanism for detecting if a block of pixels is completely hidden by other primitives that is faster but more conservative that calculating a detailed Z value for each pixel.

The RBs 118(0)-118(H) each performs detailed Z value checks and rejects pixels hidden by other pixels, and also takes the output from a pixel shader and performs final processing (e.g., blending, format conversion, and the like, as non-limiting examples) before sending to the data to a color buffer. The CCUs 120(0)-120(H) provide caches for depth and color data, and compress data before sending to system memory to save bandwidth. The GMEMs 122(0)-122(H) are used to buffer color and depth data in binning mode, and essentially serve as the Random Access Memory (RAM) of the corresponding CCUs 120(0)-120(H). Each HLSQs 124(0)-124(H) operates as a controller of a corresponding FS/TPs 126(0)-126(H), while each FS/TPs 126(0)-126(H) performs fragment shading (i.e., pixel shading) operations. The CCHEs 128(0)-128(H) provide a first-level cache between each FS/TPs 126(0)-126(H) and a UCHE 140.

In exemplary operation, the CPU 102 transmits a graphics instruction 134 to the CP circuit 130 of the GPU 104. The graphics instruction 134 represents a high-level instruction from an executing application or API requesting that a corresponding graphics operation be performed by the GPU 104 to generate an image or video. The graphics instruction 134 is received by the CP circuit 130 of the GPU 104 and is used to determine a graphics workload (captioned as "WORKLOAD" in FIG. 1) 136, which comprises a series of graphics primitives (not shown) that each represent a basic operation for generating and/or rendering an image. The CP circuit 130 transmits the graphics workload 136 to the PC_US 132, which partitions the graphics workload 136 into multiple subbatches 138(0)-138(S). The PC_US 132 then distributes each of the subbatches 138(0)-138(S) to a hardware slice of the hardware slices 106(0)-106(H) for processing in parallel. Some aspects may provide that a size of each of the subbatches 138(0)-138(S) (i.e., a number of primitives contained therein) is configurable. In some aspects, each of the subbatches 138(0)-138(S) may comprise 256 primitives (not shown).

In some aspects, the PC_US 132 may employ a round-robin slice selection mechanism to assign the subbatches 138(0)-138(S) to the hardware slices 106(0)-106(H). Some aspects may provide that the PC_US 132 may determine a current processing utilization of each of the hardware slices 106(0)-106(H), wherein each processing utilization indicates how much of the available processing resources of the corresponding hardware slice 106(0)-106(H) are currently in use. The PC_US 132 in such aspects may then assign the subbatches 138(0)-138(S) to the hardware slices 106(0)-106(H) based on the current processing utilization of the hardware slices 106(0)-106(H). For example, the PC_US 132 may assign subbatches only to hardware slices that have lower current processing utilization and thus more available processing resources.

In aspects according to FIG. 1, each CCHE 128(0)-128(H) of the hardware slices 106(0)-106(H) caches data for workloads processed by the slice hardware units of the corresponding hardware slices 106(0)-106(H) in a manner analogous to a Level 1 (L1) cache of a CPU. In the example of FIG. 1, the GPU 104 also provides a UCHE 140, analogous to a Level 2 (L2) cache of a CPU. The UCHE 140 is communicatively coupled to the CCHEs 128(0)-128(H) via a crossbar (not shown), and that caches data for all of the hardware slices 106(0)-106(H). Accordingly, in some aspects, each CCHE 128(0)-128(H) may receive data (not shown) from one or more clients (i.e., one or more of the slice hardware units of the corresponding hardware slices 106(0)-106(H)) and may synchronize the one or more clients. The UCHE 140 in such aspects also synchronizes the plurality of hardware slices 106(0)-106(H).

In some aspects, the hardware slices 106(0)-106(H) of the GPU 104 of FIG. 1 are configured to perform additional exemplary operations for determining triangle visibility and assigning triangle vertices to corresponding hardware slices. The GPU 104 in such aspects further comprises a VPC_US 142, while each of the hardware slices 106(0)-106(H) further includes a corresponding TSEFE_S 144(0)-144(H), a VPCFE_S 146(0)-146(H), a VPCBE_S 148(0)-148(H), and a TSE 150(0)-150(H). Each VPCFE_S 146(0)-146(H) receives, from a corresponding VS 112(0)-112(H), primitive attribute and position outputs (not shown) generated by the VS 112(0)-112(H). Each VPCFE_S 146(0)-146(H) writes the primitive attribute and position outputs to the GMEM 122(0)-122(H) of the corresponding hardware slice 106(0)-106(H). The primitive attribute and position outputs are then used by each TSEFE_S 144(0)-144(H) of the corresponding hardware slices 106(0)-106(H) to determines triangle visibility for each of one or more hardware slices of the hardware slices 106(0)-106(H). Each TSEFE_S 144(0)-144(H) then transmits a corresponding one or more indications of triangle visibility for each of the one or more hardware slices to the VPC_US 142. The VPC_US 142 uses the one or more indications of triangle visibility to assign triangles visible to each of the one or more hardware slices to the corresponding hardware slice. Each VPCBE_S 148(0)-148(H) of each hardware slice of the plurality of hardware slices 106(0)-106(H) identifies vertices for the triangles visible to the corresponding hardware slice, based on the triangles assigned by the VPC_US 142 of the corresponding hardware slice. Each VPCBE_S 148(0)-148(H) then transmits the vertices to the TSE 150(0)-150(H) of the corresponding hardware slice.

Figure 2A:
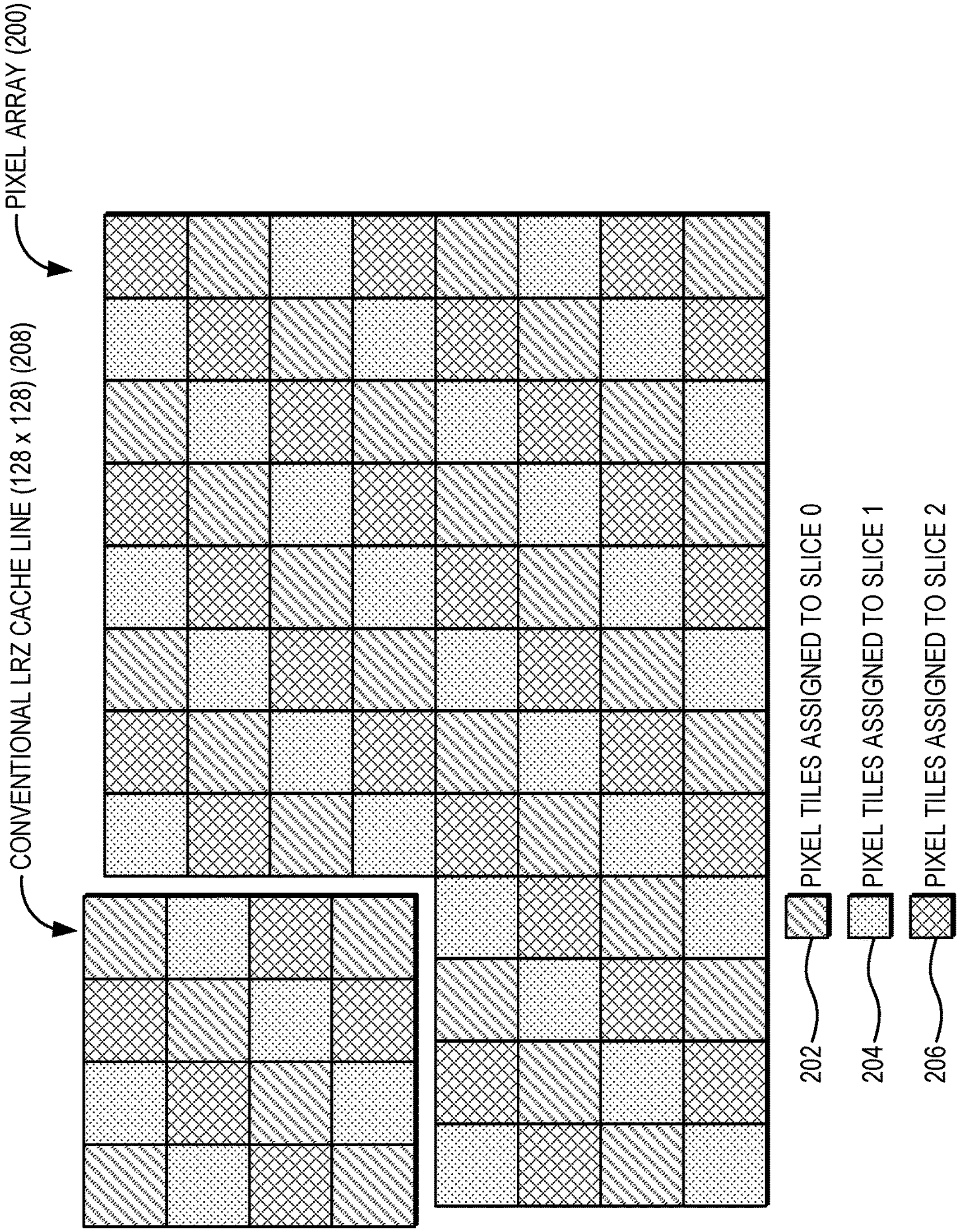
FIGS. 2A and 2B are block diagrams illustrating the arrangement of contents of a low-resolution Z buffer (LRZ) caching pixel tiles in a conventional LRZ and in some aspects described herein, respectively.
Figure 2B:
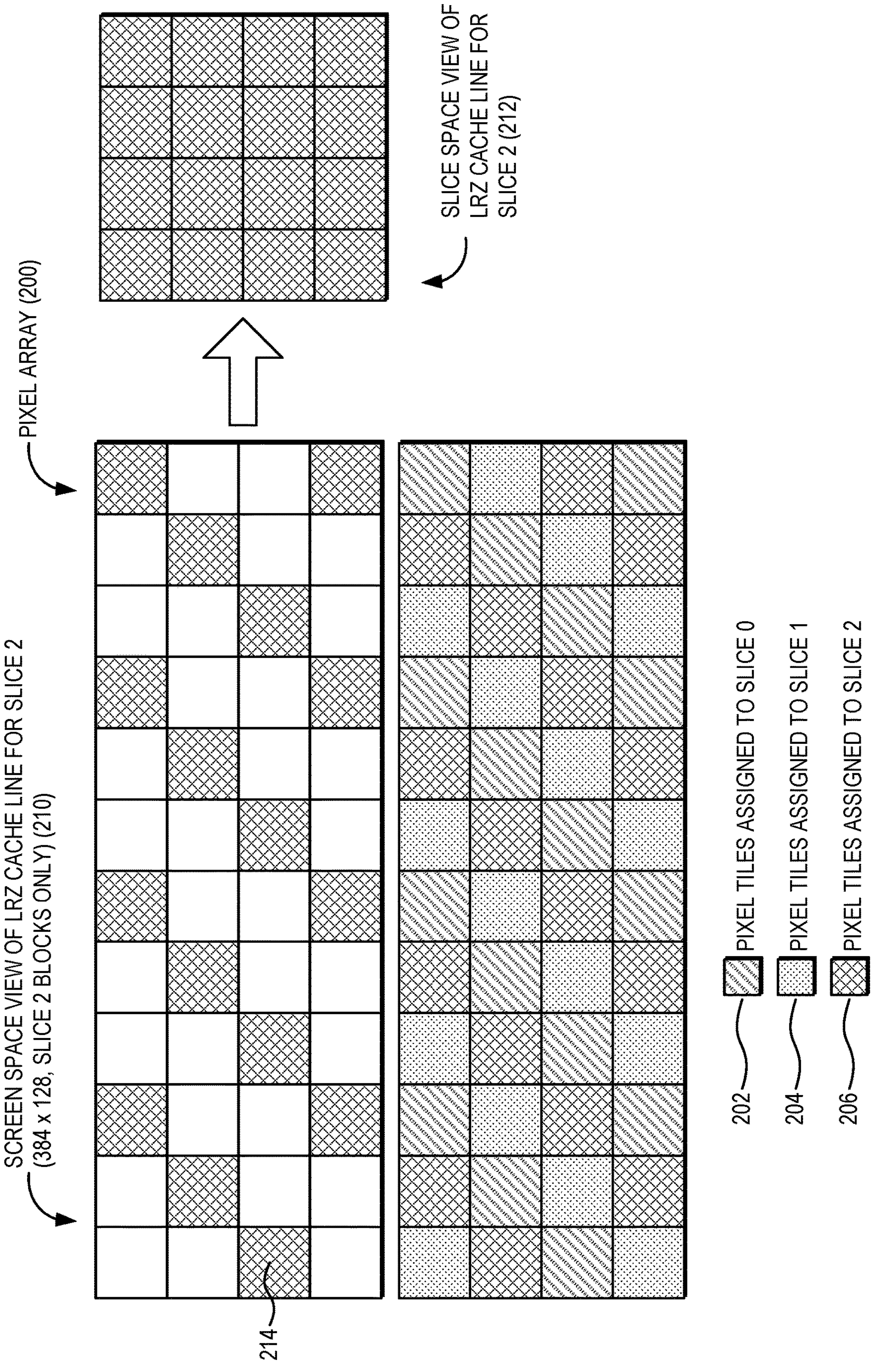

As noted above, the hardware slices 106(0)-106(H) of the GPU 104 provide corresponding LRZs 116(0)-116(H). In some aspects, the LRZs 116(0)-116(H) may be configured to store cache lines more efficiently relative to conventional LRZ. In this regard, FIGS. 2A and 2B illustrate cache line storage in conventional LRZs and in the LRZs 116(0)-116(H) of the GPU 104, respectively. As seen in FIG. 2A, a pixel array 200, representing pixels to be processed for display, is subdivided into pixel tiles, such as 32×32 pixel tiles assigned to a first pixel slice 0 as indicated by pattern 202, 32×32 pixel tiles assigned to a second pixel slice 1 as indicated by pattern 204, and 32×32 pixel tiles assigned to a third pixel slice 2 as indicated by pattern 206. As used herein, a "pixel slice" refers to the functional elements of each hardware slice 106(0)-106(H) that is responsible for pixel processing. A conventional LRZ provides a conventional LRZ cache line 208, which in this example covers 128×128 pixels, that stores pixel slices that are assigned to the pixel slice 0, the pixel slice 1, and the pixel slice 2. This results both in area wastage due to cache space not used for each slice, as well as coherency issues caused by an LRZ fast clear flag bit (not shown), which covers a 64×64 screen area and which may be read and/or written by multiple pixel slices.

Accordingly, in some aspects, each LRZ 116(0)-116(H) of each hardware slice 106(0)-106(H) of the GPU 104 is configured to store cache lines corresponding only to pixel tiles that are assigned to the corresponding hardware slice 106(0)-106(H). This may be accomplished by first mapping screen coordinates into a slice space that is continuous in coordinates and holds blocks for the hardware slice only, and then addressing tiles based on coordinates in the slice space. FIG. 2B illustrates an LRZ cache line in both a screen space view 210 and a slice space view 212 according to some aspects. As seen in the screen space view 210, the LRZ cache line covers 384×128 pixels of the pixel array 200, but only includes pixel tiles assigned to the pixel slice 2, such as the pixel tile 214. Thus, as seen in the slice space view 212, the LRZ cache line covers 128×128 pixels of the pixel tiles assigned to the pixel slice 2, thereby reducing space wastage and coherency issues associated with a conventional LRZ.

In some aspects, screen coordinates represented by integers x and y may be mapped into a slice space that is continuous in coordinates using the exemplary code shown in Table 1 below:

TABLE 1

```
switch(sliceNum) {
   case 1: lrzX = x; lrzY = y;   break;
   case 2: lrzX = {lrzX[n:6], lrzX[4:0]}; lrzY = y;   break;
   case 3: lrzX = {lrzX[n:5]/3, lrzX[4:0]}; lrzY = y;   break;
   case 4: lrzX = {lrzX[n:6], lrzX[4:0]}; lrzY = {lrzY[n:6], lrzY[4:0]};   break;
   case 5: lrzX = {lrzX[n:5]/5, lrzX[4:0]}; lrzY = y;   break;
   case 6: lrzX = {lrzX[n:5]/3, lrzX[4:0]}; lrzY = {lrzY[n:6], lrzY[4:0]};   break;
   case 7: lrzX = {lrzX[n:5]/5, lrzX[4:0]}; lrzY = y;   break;
   case 8: lrzX = {lrzX[n:7], lrzX[4:0]}; lrzY = {lrzY[n:6], lrzY[4:0]};   break;
}
```

Inside each LRZ cache block, hardware is configured to address pixel tiles using conventional formula, but based on coordinates in the slice space, as shown by the exemplary code below in Table 2:

TABLE 2

```
Switch (MSAA) {
      Case 1xAA:
         yIndex = {lrzY[13:7],0,0,0,0}; // * pitch__in__byte
         xIndex = lrzX[13:8]; // *512 blocks/line * 2B/block
         offset
={lrzX[7],lrzY[6],lrzX[6],lrzY[5],lrzX[5],lrzY[4],lrzX[4],lrzY[3],lrzX[3]};
      case 2xAA: // 128x128->128x64->...8x8->8x4
         yIndex = {lrzY[13:7],0,0,0,0,0}; // * pitch__in__byte
         xIndex = lrzX[13:7]; // *512 blocks/line * 2B/block
         offset =
{lrzY[6],lrzX[6],lrzY[5],lrzX[5],lrzY[4],lrzX[4],lrzY[3],lrzX[3],lrzY[2]};
      case 4xAA: // 128x64->64x64->...8x4->4x4
         yIndex = {lrzY[13:6],0,0,0,0}; // * pitch__in__byte
         xIndex = {lrzX[13:7]; // *512 blocks * 2B/block
         offset =
{lrzX[6],lrzY[5],lrzX[5],lrzY[4],lrzX[4],lrzY[3],lrzX[3],lrzY[2],lrzX[2]};
      case 8xAA: // 64x64 -> 64x32 -> ... 4x4-> 4x2
         yIndex = {lrzY[13:6],0,0,0,0,0}; // * pitch__in__byte
         xIndex = lrzX[13:6]; // *512 blocks * 2B/block
         offset =
{lrzY[5],lrzX[5],lrzY[4],lrzX[4],lrzY[3],lrzX[3],lrzY[2],lrzX[2],lrzY[1]};
   }
```

Finally, when accessing an external LRZ buffer, each pixel slice adds a slice pitch based on the total number of hardware slices 106(0)-106(H) in the GPU 104 to enable the system memory address to accommodate the LRZs 116(0)-116(H) for all the hardware slices 106(0)-106(H), as shown by the exemplary code below in table 3:

TABLE 3

```
BlockAddress (byte) = base + // base address in byte
   (rtai * array__pitch) + // array space in bytes
      (sliceID * slice__pitch) + // Slice space in bytes
         (yIndex * pitch) + // Pitch space in bytes
         (xIndex * 1KB) // cache block
```

The slice pitch in some aspects may be implemented as a new hardware register. Some aspects may provide that a graphics driver may allocate more LRZ buffer space to account for alignment requirements for the slice pitch.

Figure 3A:
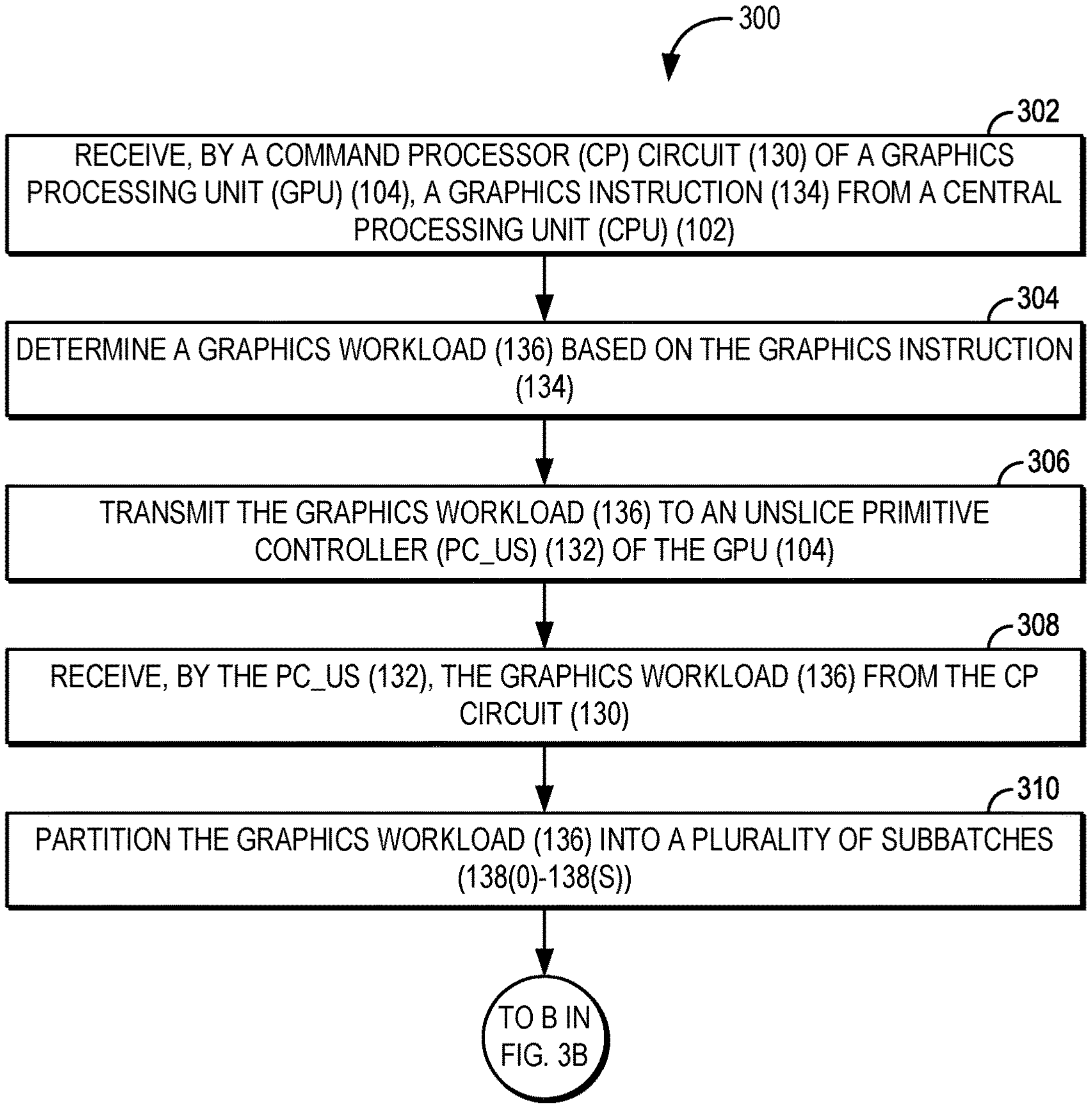
FIGS. 3A-3C are flowcharts illustrating exemplary operations of the processor-based device and the GPU of FIG. 1 for receiving and subdividing a graphics workload among hardware slices, according to some aspects.
Figure 3B:
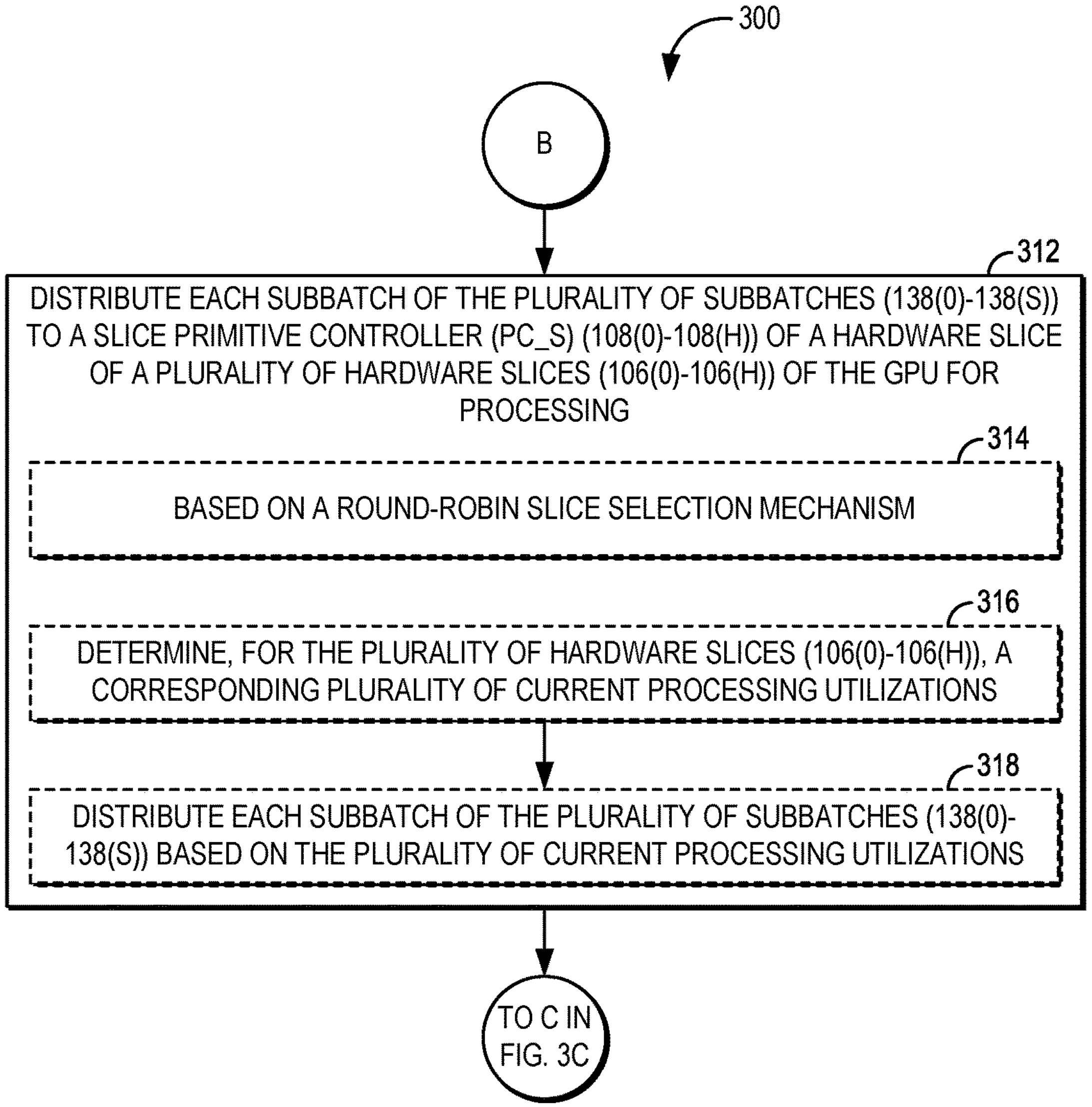
Figure 3C:
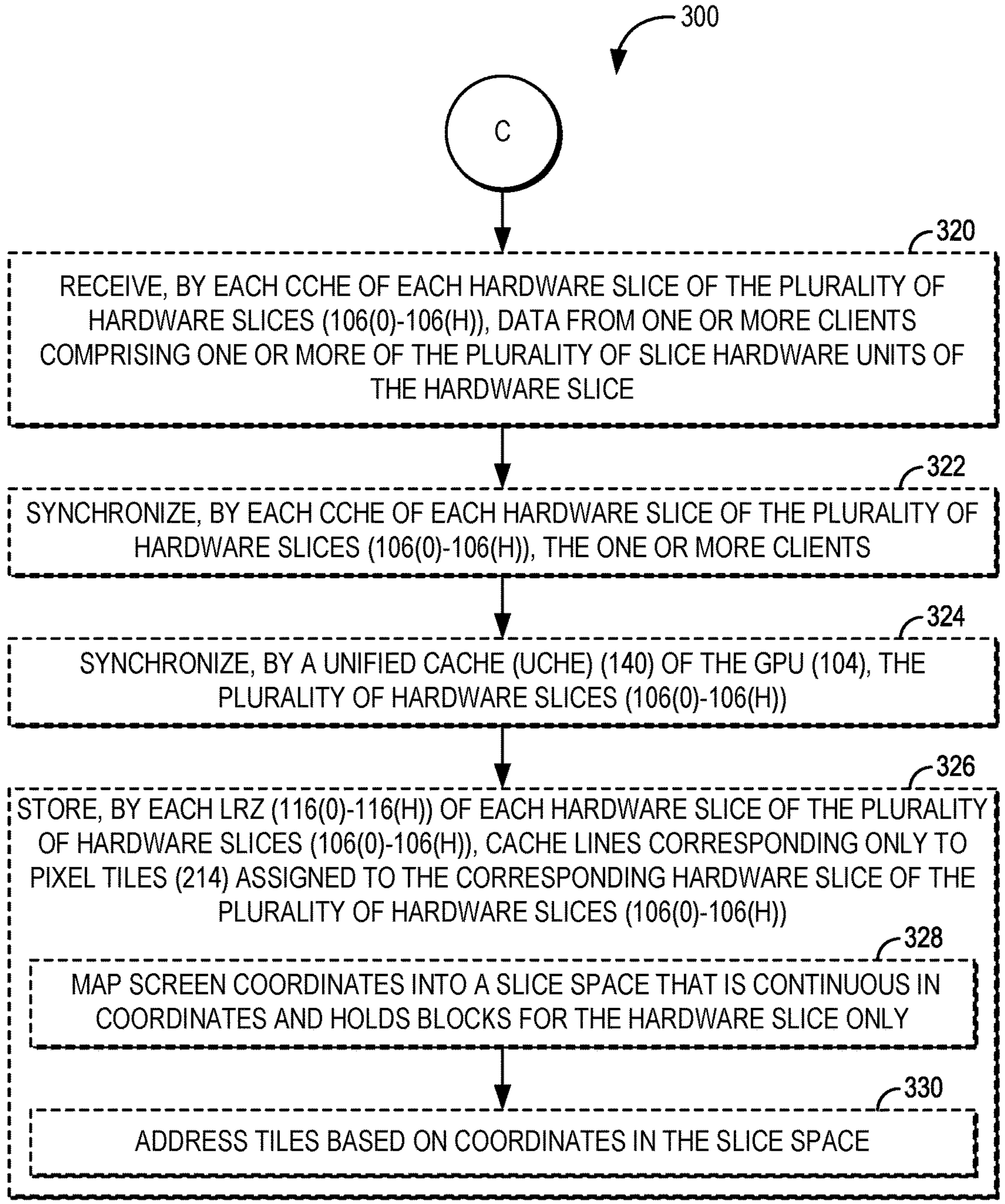

To further describe operations of the processor-based device 100 and the GPU 104 of FIG. 1 for receiving and subdividing a graphics workload among hardware slices, FIGS. 3A-3C provide a flowchart illustrating a process 300. For the sake of clarity, elements of FIGS. 1, 2A, and 2B are referenced in describing FIGS. 3A-3C. It is to be understood that some aspects may provide that some operations illustrated in FIGS. 3A-3C may be performed in an order other than that illustrated herein and/or may be omitted. In FIG. 3A, operations begin with a CP circuit of a GPU (e.g., the CP circuit 130 of the GPU 104 of FIG. 1) receiving a graphics instruction (e.g., the graphics instruction 134 of FIG. 1) from a CPU (e.g., the CPU 102 of FIG. 1) (block 302). The CP circuit 130 determines a graphics workload (e.g., the graphics workload 136 of FIG. 1) based on the graphics instruction 134 (block 304). The CP circuit 130 then transmits the graphics workload 136 to a PC_US (e.g., the PC_US 132 of FIG. 1) of the GPU 104 (block 306). The PC_US 132 receives the graphics workload 136 from the CP circuit 130 (block 308). The PC_US 132 then partitions the graphics workload 136 into a plurality of subbatches (e.g., the subbatches 138(0)-138(S) of FIG. 1) (block 310). Operations then continue at block 312 of FIG. 3B.

Referring now to FIG. 3B, the PC_US 132 next distributes each subbatch of the plurality of subbatches 138(0)-138(S) to a PC_S (e.g., the PC_S 108(0)-108(H) of FIG. 1) of a hardware slice of a plurality of hardware slices (e.g., the hardware slices 106(0)-106(H) of FIG. 1) of the GPU for processing, wherein each hardware slice of the plurality of hardware slices 106(0)-106(H) further comprises a plurality of slice hardware units (e.g., the slice hardware units of FIG. 1) (block 312). As seen in FIG. 1, the plurality of slice hardware units in some aspects may comprise the GPCs 110(0)-110(H), the VSs 112(0)-112(H), the GRASs 114(0)-114(H), the LRZs 116(0)-116(H), the RBs 118(0)-118(H), the CCUs 120(0)-120(H), the GMEMs 122(0)-122(H), the HLSQs 124(0)-124(H), the FS/TPs 126(0)-126(H), and the CCHEs 128(0)-128(H). In some aspects, the operations of block 312 for distributing each subbatch of the plurality of subbatches 138(0)-138(S) may be based on a round-robin slice selection mechanism (block 314). Some aspects may provide that the operations of block 312 for distributing each subbatch of the plurality of subbatches 138(0)-138(S) may comprise the PC_US 132 first determining, for the plurality of hardware slices 106(0)-106(H), a corresponding plurality of current processing utilizations (block 316). The PC_US 132 may then distribute each subbatch of the plurality of subbatches 138(0)-138(S) based on the plurality of current processing utilizations (block 318). Operations in some aspects may continue at block 320 of FIG. 3C.

Turning now to FIG. 3C, in some aspects, each CCHE 128(0)-128(H) of each hardware slice of the plurality of hardware slices 106(0)-106(H) receives data from one or more clients comprising one or more of the plurality of slice hardware units of the hardware slice (block 320). Each CCHE synchronizes the one or more clients (block 322). A UCHE (e.g., the UCHE 140 of FIG. 1) of the GPU 104 also synchronizes the plurality of hardware slices 106(0)-106(H) (block 324).

Some aspects may provide that each LRZ 116(0)-116(H) of each hardware slice of the plurality of hardware slices 106(0)-106(H) stores cache lines corresponding only to pixel tiles (e.g., the pixel tile 214 of FIG. 2B) assigned to the corresponding hardware slice of the plurality of hardware slices 106(0)-106(H) (block 326). According to some aspects, operations of block 326 for storing cache lines corresponding only to the pixel tiles assigned to the corresponding hardware slice of the plurality of hardware slices 106(0)-106(H) may comprise first mapping screen coordinates into a slice space that is continuous in coordinates and holds blocks for the hardware slice only (block 328). Each LRZ 116(0)-116(H) then addresses tiles based on coordinates in the slice space (block 330).

Figure 4A:
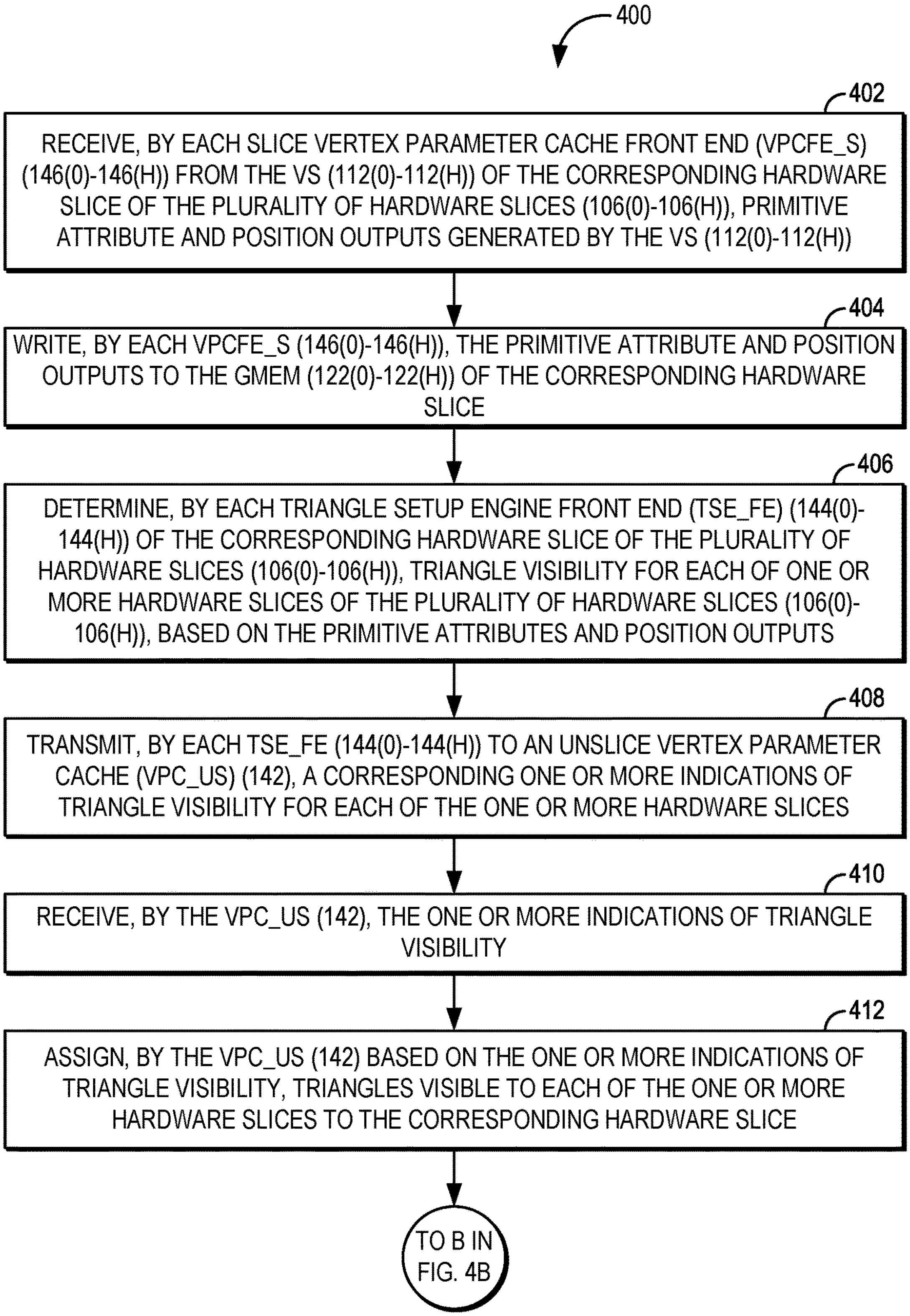
FIGS. 4A and 4B are flowcharts illustrating exemplary operations by hardware slices of the GPU of FIG. 1 for determining triangle visibility and assigning triangle vertices to corresponding hardware slices, according to some aspects.
Figure 4B:
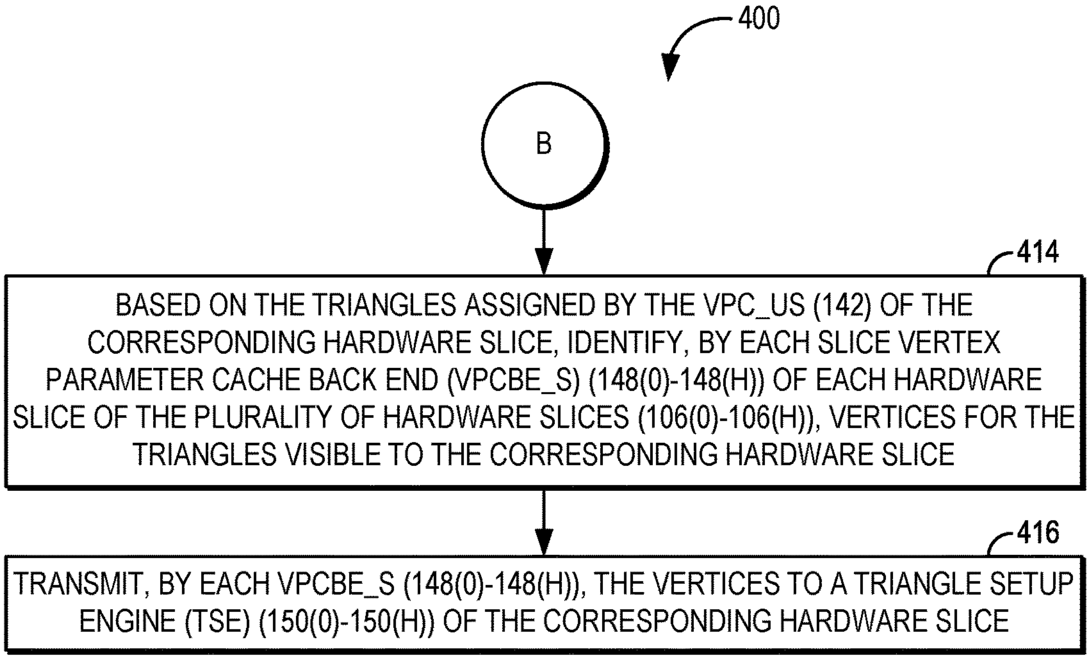

FIGS. 4A and 4B provide a flowchart illustrating an exemplary process 400 performed by hardware slices of the GPU 104 of FIG. 1 for determining triangle visibility and assigning triangle vertices to corresponding hardware slices, according to some aspects. Elements of FIG. 1 are referenced in describing FIGS. 4A and 4B for the sake of clarity. It is to be understood that, in some aspects, some operations illustrated in FIGS. 4A and 4B may be performed in an order other than that illustrated herein, or may be omitted.

Operations in FIG. 4A begin with each VPCFE_S 146(0)-146(H) of FIG. 1 receiving, from a corresponding VS such as the VS 112(0)-112(H) of the corresponding hardware slice of the plurality of hardware slices 106(0)-106(H), primitive attribute and position outputs generated by the VS 112(0)-112(H) (block 402). Each VPCFE_S 146(0)-146(H) writes the primitive attribute and position outputs to the GMEM 122(0)-122(H) of the corresponding hardware slice (block 404). Each TSEFE_S 144(0)-144(H) of the corresponding hardware slice of the plurality of hardware slices 106(0)-106(H) next determines triangle visibility for each of one or more hardware slices of the plurality of hardware slices 106(0)-106(H), based on the primitive attributes and position outputs (block 406). Each TSEFE_S 144(0)-144(H) then transmits, to a VPC_US such as the VPC_US 142 of FIG. 1, a corresponding one or more indications of triangle visibility for each of the one or more hardware slices (block 408).

The VPC_US 142 receives the one or more indications of triangle visibility (block 410). The VPC_US 142 then assigns, based on the one or more indications of triangle visibility, triangles visible to each of the one or more hardware slices to the corresponding hardware slice (block 412). Operations then continue at block 414 of FIG. 4B.

Referring now to FIG. 4B, each VPCBE_S 148(0)-148(H) of each hardware slice of the plurality of hardware slices 106(0)-106(H) identifies vertices for the triangles visible to the corresponding hardware slice, based on the triangles assigned by the VPC_US 142 of the corresponding hardware slice (block 414). Each VPCBE_S 148(0)-148(H) then transmits the vertices to a TSE 150(0)-150(H) of the corresponding hardware slice (block 416).

A GPU implemented according to the sliced GPU architecture as disclosed in aspects described herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
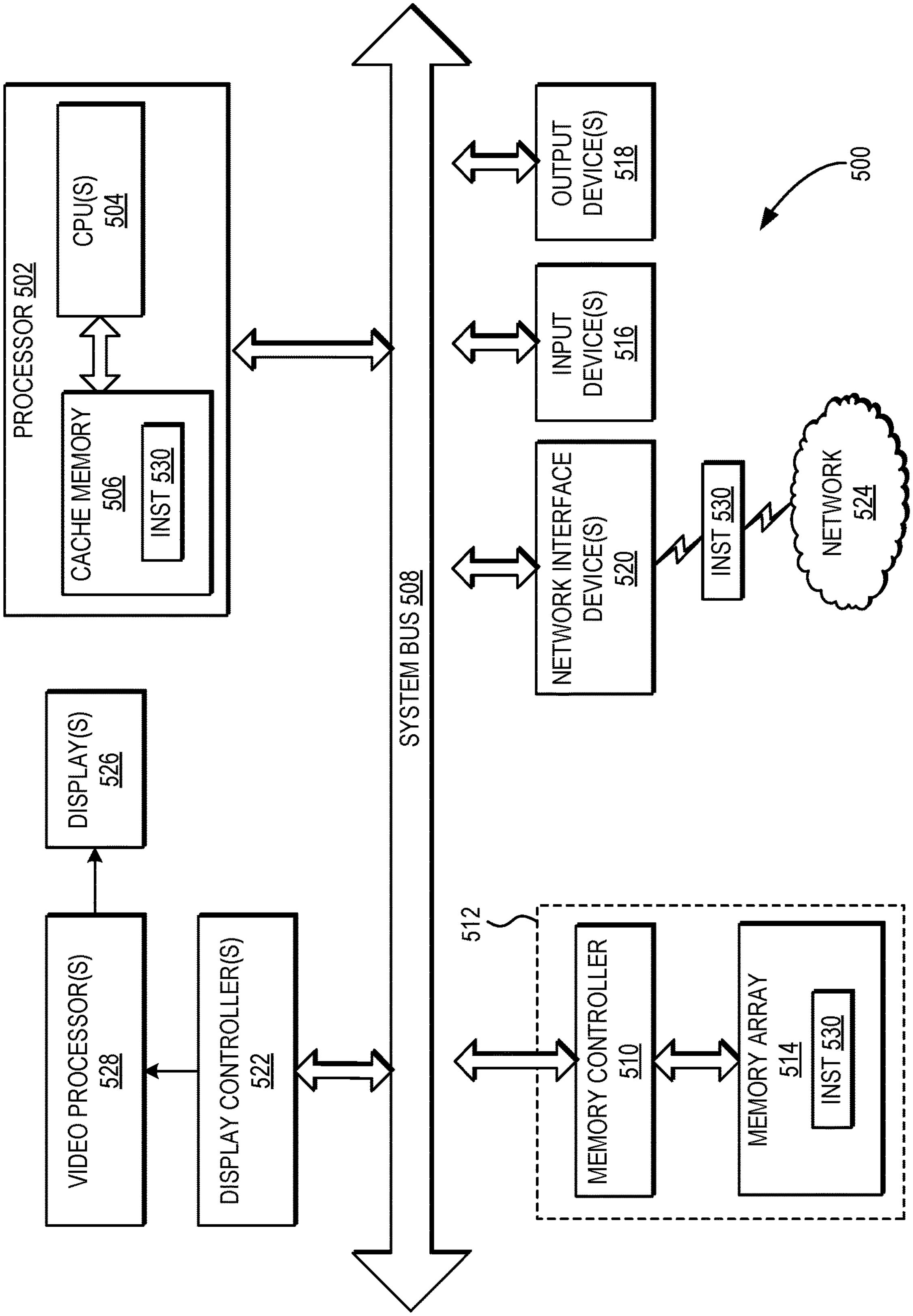
FIG. 5 is a block diagram of an exemplary processor-based device that includes but is not limited to the processor-based device of FIG. 1.

In this regard, FIG. 5 illustrates an example of a processor-based device 500 that may comprise the processor-based device 100 illustrated in FIG. 1. In this example, the processor-based device 500 includes a processor 502 that includes one or more central processing units (captioned as "CPUs" in FIG. 5) 504, which may comprise the CPU 102 of FIG. 1, and which may also be referred to as CPU cores or processor cores. The processor 502 may have cache memory 506 coupled to the processor 502 for rapid access to temporarily stored data. The processor 502 is coupled to a system bus 508 and can intercouple master and slave devices included in the processor-based device 500. As is well known, the processor 502 communicates with these other devices by exchanging address, control, and data information over the system bus 508. For example, the processor 502 can communicate bus transaction requests to a memory controller 510, as an example of a slave device. Although not illustrated in FIG. 5, multiple system buses 508 could be provided, wherein each system bus 508 constitutes a different fabric.

Other master and slave devices can be connected to the system bus 508. As illustrated in FIG. 5, these devices can include a memory system 512 that includes the memory controller 510 and a memory array(s) 514, one or more input devices 516, one or more output devices 518, one or more network interface devices 520, and one or more display controllers 522, as examples. The input device(s) 516 can include any type of input device, including but not limited to input keys, switches, voice processors, etc. The output device(s) 518 can include any type of output device, including, but not limited to, audio, video, other visual indicators, etc. The network interface device(s) 520 can be any device configured to allow exchange of data to and from a network 524. The network 524 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 520 can be configured to support any type of communications protocol desired.

The processor 502 may also be configured to access the display controller(s) 522 over the system bus 508 to control information sent to one or more displays 526. The display controller(s) 522 sends information to the display(s) 526 to be displayed via one or more video processors 528, which process the information to be displayed into a format suitable for the display(s) 526. The display controller(s) 522 and/or the video processors 528 may be comprise or be integrated into a GPU such as the GPU 104 of FIG. 1. The display(s) 526 can include any type of display, including but not limited to a cathode ray tube (CRT), a liquid crystal display (LCD), a plasma display, etc.

The processor-based device 500 in FIG. 5 may include a set of instructions (captioned as "INST" in FIG. 5) 530 that may be executed by the processor 502 for any application desired according to the instructions. The instructions 530 may be stored in the memory array 516, the processor 502, and/or the cache memory 508, each of which may comprise an example of a non-transitory computer-readable medium. The instructions 530 may also reside, completely or at least partially, within the memory array 516 and/or within the processor 502 during their execution. The instructions 530 may further be transmitted or received over the network 524, such that the network 524 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the one or more sets of instructions 530. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations.

Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
   a graphics processing unit (GPU) comprising:
      a plurality of hardware slices;
      a command processor (CP) circuit; and
      an unslice primitive controller (PC_US);
      the CP circuit configured to:
         receive a graphics instruction from a central processing unit (CPU);
         determine a graphics workload based on the graphics instruction; and
         transmit the graphics workload to the PC_US; and
      the PC_US configured to:
         receive the graphics workload from the CP circuit;
         partition the graphics workload into a plurality of subbatches; and
         distribute each subbatch of the plurality of subbatches to a slice primitive controller (PC_S) of a hardware slice of the plurality of hardware slices for processing.
2. The processor-based device of clause 1, wherein each hardware slice of the plurality of hardware slices comprises a plurality of slice hardware units, the plurality of slice hardware units comprising a geometry pipeline controller (GPC), a vertex shader (VS), a graphics rasterizer (GRAS), a low-resolution Z buffer (LRZ), a render backend (RB), a cache and compression unit (CCU), a graphics memory (GMEM), a high-level sequencer (HLSQ), a fragment shader/texture pipe (FS/TP), and a cluster cache (CCHE).
3. The processor-based device of clause 2, wherein:
   the GPU further comprises a unified cache (UCHE) communicatively coupled to each CCHE of each hardware slice of the plurality of hardware slices; and
   each CCHE of each hardware slice of the plurality of hardware slices and the UCHE are configured to operate as hierarchical caches.
4. The processor-based device of clause 3, wherein:
   each CCHE of each hardware slice of the plurality of hardware slices is configured to:
      receive data from one or more clients comprising one or more of the plurality of slice hardware units of the hardware slice; and
      synchronize the one or more clients; and
   the UCHE is configured to synchronize the plurality of hardware slices.
5. The processor-based device of any one of clauses 1-3, wherein the PC_US is configured to distribute each subbatch based on a round-robin slice selection mechanism.
6. The processor-based device of any one of clauses 1-5, wherein the PC_US is configured to distribute each subbatch by being configured to:
   determine, for the plurality of hardware slices, a corresponding plurality of current processing utilizations; and
   distribute each subbatch of the plurality of subbatches based on the plurality of current processing utilizations.
7. The processor-based device of any one of clauses 1-6, wherein a size of each subbatch of the plurality of subbatches is configurable.
8. The processor-based device of any one of clauses 1-7, wherein each subbatch comprises 256 primitives.
9. The processor-based device of any one of clauses 2-8, wherein:
   the GPU further comprises an unslice vertex parameter cache (VPC_US);
   the plurality of slice hardware units of each hardware slice of the plurality of hardware slices further comprises:
      a slice Triangle Setup Engine front end (TSEFE_S);
      a slice vertex parameter cache front end (VPCFE_S); and
      a slice vertex parameter cache back end (VPCBE_S);
   each VPCFE_S is configured to:
      receive, from the VS of the corresponding hardware slice, primitive attribute and position outputs generated by the VS; and
      write the primitive attribute and position outputs to the GMEM of the corresponding hardware slice;
   each TSEFE_S is configured to:
      determine triangle visibility for each of one or more hardware slices of the plurality of hardware slices, based on the primitive attributes and position outputs; and
      transmit, to the VPC_US, a corresponding one or more indications of triangle visibility for each of the one or more hardware slices;
   the VPC_US is configured to:
      receive the one or more indications of triangle visibility; and
      assign, based on the one or more indications of triangle visibility, triangles visible to each of the one or more hardware slices to the corresponding hardware slice; and
   each VPCBE_S is configured to:
      based on the triangles assigned by the VPC_US of the corresponding hardware slice, fetch vertices for the triangles visible to the corresponding hardware slice; and
      transmit the vertices to a Triangle Setup Engine (TSE) of the corresponding hardware slice.
10. The processor-based device of any one of clauses 2-9, wherein each LRZ is configured to store cache lines corresponding only to pixel tiles assigned to the corresponding hardware slice of the plurality of hardware slices.
11. The processor-based device of clause 10, wherein each LRZ is configured to store cache lines corresponding only to pixel tiles assigned to the corresponding hardware slice of the plurality of hardware slices by being configured to, for each hardware slice:
   map screen coordinates into a slice space that is continuous in coordinates and holds blocks for the hardware slice only; and
   address tiles based on coordinates in the slice space.
12. A processor-based device, comprising:
   means for receiving a graphics instruction from a central processing unit (CPU);
   means for determining a graphics workload based on the graphics instruction;
   means for partitioning the graphics workload into a plurality of subbatches; and means for distributing each subbatch of the plurality of subbatches to a hardware slice of a plurality of hardware slices of a graphical processing unit (GPU) for processing.

13. A method for operating a graphics processing unit (GPU) comprising a plurality of hardware slices, comprising:
receiving, by a command processor (CP) circuit of a graphics processing unit (GPU), a graphics instruction from a central processing unit (CPU);
determining a graphics workload based on the graphics instruction;
transmitting the graphics workload to an unslice primitive controller (PC_US) of the GPU;
receiving, by the PC_US, the graphics workload from the CP circuit;
partitioning the graphics workload into a plurality of subbatches; and
distributing each subbatch of the plurality of subbatches to a slice primitive controller (PC_S) of a hardware slice of the plurality of hardware slices of the GPU for processing.

14. The method of clause 13, wherein each hardware slice of the plurality of hardware slices further comprises a plurality of slice hardware units, the plurality of slice hardware units comprising a geometry pipeline controller (GPC), a vertex shader (VS), a graphics rasterizer (GRAS), a low-resolution Z buffer (LRZ), a render backend (RB), a cache and compression unit (CCU), a graphics memory (GMEM), a high-level sequencer (HLSQ), a fragment shader/texture pipe (FS/TP), and a cluster cache (CCHE).

15. The method of clause 14, wherein:
the GPU further comprises a unified cache (UCHE) communicatively coupled to each CCHE of each hardware slice of the plurality of hardware slices;
each CCHE of each hardware slice of the plurality of hardware slices and the UCHE are configured to operate as hierarchical caches; and
the method further comprises:
receiving, by each CCHE of each hardware slice of the plurality of hardware slices, data from one or more clients comprising one or more of the plurality of slice hardware units of the hardware slice;
synchronizing, by each CCHE of each hardware slice of the plurality of hardware slices, the one or more clients; and
synchronizing, by the UCHE, the plurality of hardware slices.

16. The method of any one of clauses 13-15, wherein distributing each subbatch is based on a round-robin slice selection mechanism.

17. The method of any one of clauses 13-16, wherein distributing each subbatch comprises:
determining, for the plurality of hardware slices, a corresponding plurality of current processing utilizations; and
distributing each subbatch of the plurality of subbatches based on the plurality of current processing utilizations.

18. The method of any one of clauses 13-17, wherein a size of each subbatch of the plurality of subbatches is configurable.

19. The method of any one of clauses 13-18, wherein each subbatch comprises 256 primitives.

20. The method of any one of clauses 14-19, wherein:
the GPU further comprises an unslice vertex parameter cache (VPC_US);
the plurality of slice hardware units of each hardware slice of the plurality of hardware slices further comprises:
a slice Triangle Setup Engine front end (TSEFE_S);
a slice vertex parameter cache front end (VPCFE_S); and
a slice vertex parameter cache back end (VPCBE_S); and
the method further comprises:
receiving, by each VPCFE_S from the VS of the corresponding hardware slice, primitive attribute and position outputs generated by the VS;
writing, by each VPCFE_S, the primitive attribute and position outputs to the GMEM of the corresponding hardware slice;
determining, by each TSEFE_S, triangle visibility for each of one or more hardware slices of the plurality of hardware slices, based on the primitive attributes and position outputs;
transmitting, by each TSEFE_S to the VPC_US, a corresponding one or more indications of triangle visibility for each of the one or more hardware slices;
receiving, by the VPC_US, the one or more indications of triangle visibility;
assigning, by the VPC_US based on the one or more indications of triangle visibility, triangles visible to each of the one or more hardware slices to the corresponding hardware slice;
based on the triangles assigned by the VPC_US of the corresponding hardware slice, fetching, by each VPCBE_S of each hardware slice of the plurality of hardware slices, vertices for the triangles visible to the corresponding hardware slice; and
transmitting the vertices to a Triangle Setup Engine (TSE) of the corresponding hardware slice.

21. The method of any one of clauses 14-20, further comprising storing, by each LRZ of each hardware slice of the plurality of hardware slices, cache lines corresponding only to pixel tiles assigned to the corresponding hardware slice of the plurality of hardware slices.

22. The method of clause 21, wherein storing cache lines corresponding only to pixel tiles assigned to the corresponding hardware slice of the plurality of hardware slices comprises:
mapping screen coordinates into a slice space that is continuous in coordinates and holds blocks for the hardware slice only; and
addressing tiles based on coordinates in the slice space.

23. A non-transitory computer-readable medium having stored thereon computer-executable instructions which, when executed by a processor, cause the processor to:
receive a graphics instruction;
determine a graphics workload based on the graphics instruction;
partition the graphics workload into a plurality of subbatches; and
distribute each subbatch of the plurality of subbatches to a slice primitive controller (PC_S) of a hardware slice of a plurality of hardware slices for processing.

24. The non-transitory computer-readable medium of clause 23, wherein each hardware slice of the plurality of hardware slices comprises a plurality of slice hardware units, the plurality of slice hardware units comprising a geometry pipeline controller (GPC), a vertex shader (VS), a graphics rasterizer (GRAS), a low-resolution Z buffer (LRZ), a render backend (RB), a cache and compression unit (CCU), a graphics memory (GMEM), a high-level sequencer (HLSQ), a fragment shader/texture pipe (FS/TP), and a cluster cache (CCHE).

25. The non-transitory computer-readable medium of any one of clauses 23-24, wherein the computer-executable instructions further cause the processor to:
- receive data from one or more clients comprising one or more of the plurality of slice hardware units of the hardware slice;
- synchronize the one or more clients; and
- synchronize the plurality of hardware slices.

26. The non-transitory computer-readable medium of any one of clauses 23-25, wherein the computer-executable instructions cause the processor to distribute each subbatch based on a round-robin slice selection mechanism.

27. The non-transitory computer-readable medium of any one of clauses 23-26, wherein the computer-executable instructions cause the processor to distribute each subbatch by causing the processor to:
- determine, for the plurality of hardware slices, a corresponding plurality of current processing utilizations; and
- distribute each subbatch of the plurality of subbatches based on the plurality of current processing utilizations.

28. The non-transitory computer-readable medium of any one of clauses 23-27, wherein a size of each subbatch of the plurality of subbatches is configurable.

29. The non-transitory computer-readable medium of any one of clauses 23-28, wherein each subbatch comprises 256 primitives.

30. The non-transitory computer-readable medium of any one of clauses 24-29, wherein the computer-executable instructions further cause the processor to:
- receive primitive attribute and position outputs generated by the VS of each hardware slice;
- write the primitive attribute and position outputs to the GMEM of the hardware slice;
- determine triangle visibility for each of one or more hardware slices of the plurality of hardware slices, based on the primitive attributes and position outputs;
- assigning, based on a corresponding one or more indications of triangle visibility, triangles visible to each of the one or more hardware slices to the corresponding hardware slice;
- fetch vertices for the triangles visible to the corresponding hardware slice; and
- transmit the vertices to a Triangle Setup Engine (TSE) of the corresponding hardware slice.

31. The non-transitory computer-readable medium of any one of clauses 23-30, wherein the computer-executable instructions further cause the processor to store cache lines corresponding only to pixel tiles assigned to the corresponding hardware slice of the plurality of hardware slices.

32. The non-transitory computer-readable medium of clause 31, wherein the computer-executable instructions cause the processor to store cache lines corresponding only to pixel tiles assigned to the corresponding hardware slice of the plurality of hardware slices by causing the processor to:
- map screen coordinates into a slice space that is continuous in coordinates and holds blocks for the hardware slice only; and
- address tiles based on coordinates in the slice space.

What is claimed is:

1. A processor-based device, comprising:
a graphics processing unit (GPU) comprising:
- a plurality of hardware slices, each comprising a low-resolution Z buffer (LRZ);
- a command processor (CP) circuit; and
- an unslice primitive controller (PC_US);
- the CP circuit configured to:
  - receive a graphics instruction from a central processing unit (CPU);
  - determine a graphics workload based on the graphics instruction; and
  - transmit the graphics workload to the PC_US;
- the PC_US configured to:
  - receive the graphics workload from the CP circuit;
  - partition the graphics workload into a plurality of subbatches; and
- distribute each subbatch of the plurality of subbatches to a slice primitive controller (PC_S) of a hardware slice of the plurality of hardware slices for processing;
- wherein each LRZ is configured to store cache lines corresponding only to pixel tiles assigned to the corresponding hardware slice of the plurality of hardware slices by being configured to, for each hardware slice:
  - map screen coordinates into a slice space that is continuous in coordinates and holds blocks for the hardware slice only; and
  - address tiles based on coordinates in the slice space.

2. The processor-based device of claim 1, wherein each hardware slice of the plurality of hardware slices further comprises a plurality of slice hardware units, the plurality of slice hardware units comprising a geometry pipeline controller (GPC), a vertex shader (VS), a graphics rasterizer (GRAS), a render backend (RB), a cache and compression unit (CCU), a graphics memory (GMEM), a high-level sequencer (HLSQ), a fragment shader/texture pipe (FS/TP), and a cluster cache (CCHE).

3. The processor-based device of claim 2, wherein:
- the GPU further comprises a unified cache (UCHE) communicatively coupled to each CCHE of each hardware slice of the plurality of hardware slices; and
- each CCHE of each hardware slice of the plurality of hardware slices and the UCHE are configured to operate as hierarchical caches.

4. The processor-based device of claim 3, wherein:
- each CCHE of each hardware slice of the plurality of hardware slices is configured to:
  - receive data from one or more clients comprising one or more of the plurality of slice hardware units of the hardware slice; and
  - synchronize the one or more clients; and
- the UCHE is configured to synchronize the plurality of hardware slices.

5. The processor-based device of claim 2, wherein:
- the GPU further comprises an unslice vertex parameter cache (VPC_US);
- the plurality of slice hardware units of each hardware slice of the plurality of hardware slices further comprises:

a slice Triangle Setup Engine front end (TSEFE_S);

a slice vertex parameter cache front end (VPCFE_S); and a slice vertex parameter cache back end (VPCBE_S);

each VPCFE_S is configured to:

receive, from the VS of the corresponding hardware slice, primitive attribute and position outputs generated by the VS; and write the primitive attribute and position outputs to the GMEM of the corresponding hardware slice;

each TSEFE_S is configured to:

determine triangle visibility for each of one or more hardware slices of the plurality of hardware slices, based on the primitive attributes and position outputs; and transmit, to the VPC_US, a corresponding one or more indications of triangle visibility for each of the one or more hardware slices;

the VPC_US is configured to:

receive the one or more indications of triangle visibility; and assign, based on the one or more indications of triangle visibility, triangles visible to each of the one or more hardware slices to the corresponding hardware slice; and each VPCBE_S is configured to:

based on the triangles assigned by the VPC_US of the corresponding hardware slice, fetch vertices for the triangles visible to the corresponding hardware slice; and transmit the vertices to a Triangle Setup Engine (TSE) of the corresponding hardware slice.

6. The processor-based device of claim 1, wherein the PC_US is configured to distribute each subbatch by being configured to:

determine, for the plurality of hardware slices, a corresponding plurality of current processing utilizations; and distribute each subbatch of the plurality of subbatches based on the plurality of current processing utilizations.

7. The processor-based device of claim 1, wherein a size of each subbatch of the plurality of subbatches is configurable.

8. The processor-based device of claim 1, wherein each subbatch comprises 256 primitives.

9. The processor-based device of claim 1, wherein the PC_US is configured to distribute each subbatch based on a round-robin slice selection mechanism.

10. A processor-based device, comprising:

means for receiving a graphics instruction from a central processing unit (CPU);

means for determining a graphics workload based on the graphics instruction;

means for partitioning the graphics workload into a plurality of subbatches; and means for distributing each subbatch of the plurality of subbatches to a hardware slice of a plurality of hardware slices of a graphical processing unit (GPU) for processing;

wherein each hardware slice of the plurality of hardware slices comprises means for storing cache lines corresponding only to pixel tiles assigned to the corresponding hardware slice of the plurality of hardware slices, the means for storing cache lines comprising:

means for mapping screen coordinates into a slice space that is continuous in coordinates and holds blocks for the hardware slice only; and means for addressing tiles based on coordinates in the slice space.

11. A method for operating a graphics processing unit (GPU) comprising a plurality of hardware slices, each comprising a low-resolution Z buffer (LRZ), the method comprising:

receiving, by a command processor (CP) circuit of a graphics processing unit (GPU), a graphics instruction from a central processing unit (CPU);

determining a graphics workload based on the graphics instruction;

transmitting the graphics workload to an unslice primitive controller (PC_US) of the GPU;

receiving, by the PC_US, the graphics workload from the CP circuit;

partitioning the graphics workload into a plurality of subbatches;

distributing each subbatch of the plurality of subbatches to a slice primitive controller (PC_S) of a hardware slice of the plurality of hardware slices of the GPU for processing; and storing, by each LRZ of each hardware slice of the plurality of hardware slices, cache lines corresponding only to pixel tiles assigned to the corresponding hardware slice of the plurality of hardware slices;

wherein storing cache lines corresponding only to pixel tiles assigned to the corresponding hardware slice of the plurality of hardware slices comprises:

mapping screen coordinates into a slice space that is continuous in coordinates and holds blocks for the hardware slice only; and addressing tiles based on coordinates in the slice space.

12. The method of claim 11, wherein each hardware slice of the plurality of hardware slices further comprises a plurality of slice hardware units, the plurality of slice hardware units comprising a geometry pipeline controller (GPC), a vertex shader (VS), a graphics rasterizer (GRAS), a render backend (RB), a cache and compression unit (CCU), a graphics memory (GMEM), a high-level sequencer (HLSQ), a fragment shader/texture pipe (FS/TP), and a cluster cache (CCHE).

13. The method of claim 12, wherein:

the GPU further comprises a unified cache (UCHE) communicatively coupled to each CCHE of each hardware slice of the plurality of hardware slices;

each CCHE of each hardware slice of the plurality of hardware slices and the UCHE are configured to operate as hierarchical caches; and the method further comprises:

receiving, by each CCHE of each hardware slice of the plurality of hardware slices, data from one or more clients comprising one or more of the plurality of slice hardware units of the hardware slice;

synchronizing, by each CCHE of each hardware slice of the plurality of hardware slices, the one or more clients; and synchronizing, by the UCHE, the plurality of hardware slices.

14. The method of claim 12, wherein:

the GPU further comprises an unslice vertex parameter cache (VPC_US);

the plurality of slice hardware units of each hardware slice of the plurality of hardware slices further comprises:

a slice Triangle Setup Engine front end (TSEFE_S);

a slice vertex parameter cache front end (VPCFE_S); and a slice vertex parameter cache back end (VPCBE_S); and the method further comprises:

receiving, by each VPCFE_S from the VS of the corresponding hardware slice, primitive attribute and position outputs generated by the VS;

writing, by each VPCFE_S, the primitive attribute and position outputs to the GMEM of the corresponding hardware slice;

determining, by each TSEFE_S, triangle visibility for each of one or more hardware slices of the plurality of hardware slices, based on the primitive attributes and position outputs;

transmitting, by each TSEFE_S to the VPC_US, a corresponding one or more indications of triangle visibility for each of the one or more hardware slices;

receiving, by the VPC_US, the one or more indications of triangle visibility;

assigning, by the VPC_US based on the one or more indications of triangle visibility, triangles visible to each of the one or more hardware slices to the corresponding hardware slice;

based on the triangles assigned by the VPC_US of the corresponding hardware slice, fetching, by each VPCBE_S of each hardware slice of the plurality of hardware slices, vertices for the triangles visible to the corresponding hardware slice; and transmitting the vertices to a Triangle Setup Engine (TSE) of the corresponding hardware slice.

15. The method of claim 11, wherein each subbatch comprises 256 primitives.

16. The method of claim 11, wherein distributing each subbatch is based on a round-robin slice selection mechanism.

17. The method of claim 11, wherein distributing each subbatch comprises:

determining, for the plurality of hardware slices, a corresponding plurality of current processing utilizations; and distributing each subbatch of the plurality of subbatches based on the plurality of current processing utilizations.

18. The method of claim 11, wherein a size of each subbatch of the plurality of subbatches is configurable.

19. A non-transitory computer-readable medium having stored thereon computer-executable instructions which, when executed by a processor, cause the processor to:

receive a graphics instruction;

determine a graphics workload based on the graphics instruction;

partition the graphics workload into a plurality of subbatches; and distribute each subbatch of the plurality of subbatches to a slice primitive controller (PC_S) of a hardware slice of a plurality of hardware slices for processing;

wherein each hardware slice of the plurality of hardware slices comprises a low-resolution Z buffer (LRZ); and the computer-executable instructions further cause the processor to store cache lines corresponding only to pixel tiles assigned to the corresponding hardware slice of the plurality of hardware slices by causing the processor to:

map screen coordinates into a slice space that is continuous in coordinates and holds blocks for the hardware slice only; and address tiles based on coordinates in the slice space.

20. The non-transitory computer-readable medium of claim 19, wherein the computer-executable instructions cause the processor to distribute each subbatch based on a round-robin slice selection mechanism.

21. The non-transitory computer-readable medium of claim 19, wherein the computer-executable instructions cause the processor to distribute each subbatch by causing the processor to:

determine, for the plurality of hardware slices, a corresponding plurality of current processing utilizations; and distribute each subbatch of the plurality of subbatches based on the plurality of current processing utilizations.

22. The non-transitory computer-readable medium of claim 19, wherein a size of each subbatch of the plurality of subbatches is configurable.

23. The non-transitory computer-readable medium of claim 19, wherein each subbatch comprises 256 primitives.

24. The non-transitory computer-readable medium of claim 19, wherein each hardware slice of the plurality of hardware slices comprises a plurality of slice hardware units, the plurality of slice hardware units comprising a geometry pipeline controller (GPC), a vertex shader (VS), a graphics rasterizer (GRAS), a render backend (RB), a cache and compression unit (CCU), a graphics memory (GMEM), a high-level sequencer (HLSQ), a fragment shader/texture pipe (FS/TP), and a cluster cache (CCHE).

25. The non-transitory computer-readable medium of claim 24, wherein the computer-executable instructions further cause the processor to:

receive data from one or more clients comprising one or more of the plurality of slice hardware units of the hardware slice;

synchronize the one or more clients; and synchronize the plurality of hardware slices.

26. The non-transitory computer-readable medium of claim 24, wherein the computer-executable instructions further cause the processor to:

receive primitive attribute and position outputs generated by the VS of each hardware slice;

write the primitive attribute and position outputs to the GMEM of the hardware slice;

determine triangle visibility for each of one or more hardware slices of the plurality of hardware slices, based on the primitive attributes and position outputs;

assigning, based on a corresponding one or more indications of triangle visibility, triangles visible to each of the one or more hardware slices to the corresponding hardware slice;

fetch vertices for the triangles visible to the corresponding hardware slice; and transmit the vertices to a Triangle Setup Engine (TSE) of the corresponding hardware slice.

* * * * *